United States Patent
McGanty et al.

(10) Patent No.: US 10,763,633 B2
(45) Date of Patent: Sep. 1, 2020

(54) PLANAR WAVEGUIDES WITH ENHANCED SUPPORT AND/OR COOLING FEATURES FOR HIGH-POWER LASER SYSTEMS

(71) Applicant: Raytheon Company, Waltham, MA (US)

(72) Inventors: Stephen H. McGanty, Hermosa Beach, CA (US); David M. Filgas, Newbury Park, CA (US); Christopher R. Koontz, Manhattan Beach, CA (US)

(73) Assignee: Raytheon Company, Waltham, MA (US)

( * ) Notice: Subject to any disclaimer, the term of this patent is extended or adjusted under 35 U.S.C. 154(b) by 317 days.

(21) Appl. No.: 15/825,593

(22) Filed: Nov. 29, 2017

(65) Prior Publication Data

US 2018/0090901 A1    Mar. 29, 2018

Related U.S. Application Data

(62) Division of application No. 15/041,909, filed on Feb. 11, 2016, now Pat. No. 10,069,270.

(51) Int. Cl.
*H01S 3/04* (2006.01)
*H01S 3/042* (2006.01)
(Continued)

(52) U.S. Cl.
CPC ............ *H01S 3/0407* (2013.01); *H01S 3/042* (2013.01); *H01S 3/0405* (2013.01);
(Continued)

(58) Field of Classification Search
CPC .... H01S 3/0621; H01S 3/0632; H01S 3/0405; H01S 3/0407; G02B 6/10; G02B 6/102;
(Continued)

(56) References Cited

U.S. PATENT DOCUMENTS 5,105,430 A    4/1992    Mundinger et al.
5,233,624 A    8/1993    LaPlante et al.
(Continued)

FOREIGN PATENT DOCUMENTS

EP    1003252 A2    5/2000
EP    1357647 A2    10/2003
(Continued)

OTHER PUBLICATIONS

Beach et al., "Continuous-Wave and Passively Q-Switched Cladding-Pumped Planar Waveguide Lasers," Optics Letters, vol. 26, No. 12, Jun. 2001, 4 pages.

(Continued)

*Primary Examiner* — Eric L Bolda (57) ABSTRACT

This disclosure provides planar waveguides with enhanced support and/or cooling. One or more endcaps could be disposed between coating/cladding layers at one or more ends of a core region, where the core region is doped with at least one active ion species and each endcap is not doped with any active ion species that creates substantial absorption at pump and signal wavelengths. A core region could include at least one crystal or crystalline material, and at least one cladding layer could include at least one glass. Different types of coolers could be disposed on or adjacent to different coating/cladding layers. Side claddings could be disposed on opposite sides of a planar waveguide, where the opposite sides represent longer sides of the waveguide. Endcaps and one or more coolers could be sealed to a housing, and coolant can flow through a substantially linear passageway along a length of the waveguide. One side of a planar waveguide could be uncooled.

20 Claims, 9 Drawing Sheets

(51) Int. Cl.
*H01S 3/06* (2006.01)
*H01S 3/063* (2006.01)
*G02B 6/10* (2006.01)
*H01S 3/13* (2006.01)
*H01S 3/131* (2006.01)
*H01S 3/23* (2006.01)

(52) U.S. Cl.
CPC .......... *H01S 3/0621* (2013.01); *H01S 3/0632* (2013.01); *G02B 6/10* (2013.01); *H01S 3/0625* (2013.01); *H01S 3/1305* (2013.01); *H01S 3/1312* (2013.01); *H01S 3/2308* (2013.01)

(58) Field of Classification Search
CPC ...... G02B 6/107; G02B 6/12; G02B 6/12002; G02B 6/12004; G02B 6/12016; G02B 6/12038

See application file for complete search history.

(56) References Cited

U.S. PATENT DOCUMENTS

| | | |
|---|---|---|
| 5,327,444 A | 7/1994 | Mooradian |
| 5,363,391 A | 11/1994 | Matthews et al. |
| 5,377,212 A | 12/1994 | Tatsuno et al. |
| 5,394,427 A * | 2/1995 | McMinn ................ H01S 3/025 372/35 |
| 5,398,130 A | 3/1995 | Redman |
| 5,778,132 A | 7/1998 | Csipkes et al. |
| 5,852,622 A * | 12/1998 | Meissner ................ B32B 37/00 372/39 |
| 5,863,017 A | 1/1999 | Larson et al. |
| 6,026,109 A | 2/2000 | Micke et al. |
| 6,039,632 A | 3/2000 | Robertson |
| 6,072,814 A | 6/2000 | Ryan et al. |
| 6,094,297 A | 7/2000 | Injeyan et al. |
| 6,160,824 A * | 12/2000 | Meissner .............. H01S 3/0632 372/10 |
| 6,289,031 B1 | 9/2001 | Stultz et al. |
| 6,417,955 B1 | 7/2002 | Kafka et al. |
| 6,529,318 B1 | 3/2003 | Kaneda et al. |
| 6,690,696 B2 | 2/2004 | Byren et al. |
| 6,738,396 B2 * | 5/2004 | Filgas ................ B23K 26/0648 372/19 |
| 6,809,307 B2 | 10/2004 | Byren et al. |
| 6,810,060 B2 | 10/2004 | Vetrovec |
| 6,859,472 B2 | 2/2005 | Betin et al. |
| 6,937,629 B2 | 8/2005 | Perry et al. |
| 7,065,121 B2 | 6/2006 | Filgas et al. |
| 7,472,741 B2 | 1/2009 | Johnson et al. |
| 7,983,312 B2 | 7/2011 | Shkunov et al. |
| 8,488,245 B1 | 7/2013 | Chann et al. |
| 8,565,272 B2 | 10/2013 | Shkunov et al. |
| 8,731,013 B2 | 5/2014 | Byren et al. |
| 8,787,768 B2 | 7/2014 | Klotz et al. |
| 8,977,097 B2 | 3/2015 | Filgas |
| 9,014,226 B2 | 4/2015 | Perin |
| 9,146,357 B2 | 9/2015 | Wada et al. |
| 9,574,749 B2 | 2/2017 | Trail et al. |
| 2002/0110166 A1 | 8/2002 | Filgas |
| 2002/0118718 A1 | 8/2002 | Honea et al. |
| 2003/0010823 A1 | 1/2003 | Tsikos et al. |
| 2003/0138021 A1 | 7/2003 | Hodgson et al. |
| 2003/0161375 A1 * | 8/2003 | Filgas ................ B23K 26/0648 372/66 |
| 2003/0231667 A1 | 12/2003 | Byren et al. |
| 2004/0028094 A1 | 2/2004 | Betin et al. |
| 2004/0032896 A1 | 2/2004 | Patel et al. |
| 2004/0052280 A1 | 3/2004 | Rice |
| 2004/0258123 A1 | 12/2004 | Zamel et al. |
| 2005/0090030 A1 | 4/2005 | Sridharan et al. |
| 2006/0108098 A1 | 5/2006 | Stevanovic et al. |
| 2006/0175041 A1 | 8/2006 | Johnson et al. |
| 2006/0227841 A1 | 10/2006 | Savich |
| 2006/0263024 A1 | 11/2006 | Dong et al. |
| 2007/0238219 A1 | 10/2007 | Bennett et al. |
| 2008/0037601 A1 | 2/2008 | Nielsen |
| 2008/0069160 A1 | 3/2008 | Stephens, IV |
| 2008/0095204 A1 | 4/2008 | Miyajima et al. |
| 2008/0198882 A1 | 8/2008 | Clar et al. |
| 2008/0239317 A1 | 10/2008 | Schulkin et al. |
| 2009/0290167 A1 | 11/2009 | Flanders et al. |
| 2010/0002740 A1 * | 1/2010 | Ushinsky .............. H01S 3/0612 372/45.011 |
| 2010/0195676 A1 | 8/2010 | Shakir et al. |
| 2011/0026102 A1 * | 2/2011 | Starodubov .......... H01S 3/0675 359/326 |
| 2011/0075687 A1 | 3/2011 | Gokay |
| 2011/0200292 A1 * | 8/2011 | Filgas ...................... G02B 6/12 385/129 |
| 2012/0051688 A1 | 3/2012 | Pitwon |
| 2012/0103569 A1 | 5/2012 | Kim |
| 2013/0223470 A1 | 8/2013 | Kim et al. |
| 2014/0160786 A1 | 6/2014 | Hargis et al. |
| 2014/0212094 A1 | 7/2014 | Wada et al. |
| 2014/0268309 A1 | 9/2014 | Strohkendl |
| 2015/0194784 A1 | 7/2015 | Kwon et al. |
| 2015/0378093 A1 | 12/2015 | Murgai |
| 2016/0028210 A1 | 1/2016 | O'Shaughnessy et al. |
| 2016/0047981 A1 | 2/2016 | Filgas et al. |
| 2016/0047982 A1 * | 2/2016 | Filgas .................. G02B 6/1228 385/30 |
| 2016/0218483 A1 | 7/2016 | Tayebati et al. |
| 2017/0353005 A1 * | 12/2017 | Filgas .................. H01S 3/2308 |

FOREIGN PATENT DOCUMENTS

| | | |
|---|---|---|
| EP | 1492207 A2 | 12/2004 |
| JP | 2000036631 A | 2/2000 |
| JP | 2013205573 A | 10/2013 |
| WO | 0027000 A1 | 5/2000 |
| WO | 0161799 A2 | 8/2001 |

OTHER PUBLICATIONS

International Search Report and Written Opinion of the International Searching Authority in PCT Application No. PCT/US2016/065988, dated Nov. 16, 2017, 21 pages.

U.S. Appl. No. 15/041,909, filed Feb. 11, 2016; 38 pages.

U.S. Appl. No. 15/825,653, filed Nov. 29, 2017; 38 pages.

U.S. Appl. No. 15/825,677, filed Nov. 29, 2017; 38 pages.

International Search Report and Written Opinion of the International Searching Authority in PCT/US2015/055014 dated Feb. 5, 2016; 8 pages.

Pearson et al., Applied Optics and Optical Engineering, edited by R. Shannon and J. Wyant, vol. VII, Chapter 8, "Adaptive Techniques for Wave-Front Correction", pp. 259-264.

P. McManamon et al., "A Review of Phased Array Steering for Narrow-Band Electrooptical Systems", Proceedings of the IEEE, vol. 97, No. 6, Jun. 2009, pp. 1078-1096.

Filgas et al., "System and Method for Cooling a Laser Gain Medium Using an Ultra-Thin Liquid Thermal Optical Interface", U.S. Appl. No. 14/661,828, filed Mar. 18, 2015, 25 pages.

Zamudio et al., "Techniques for Forming Waveguides for Use in Laser Systems or Other Systems and Associated Devices", U.S. Appl. No. 14/845,916, filed Sep. 4, 2015, 26 pages.

Filgas et al., "High-Power Planar Waveguide (PWG) Pumphead With Modular Components for High-Power Laser System", U.S. Appl. No. 15/233,238, filed Aug. 10, 2016, 77 pages.

Filgas et al., "High-Gain Single Planar Waveguide (PWG) Amplifier Laser System", U.S. Appl. No. 15/233,913, filed Aug. 10, 2016, 77 pages.

Filgas et al., "Dual-Function Optical Bench and Cooling Manifold for High-Power Laser System", U.S. Appl. No. 15/233,928, filed Aug. 10, 2016, 80 pages.

Filgas et al., "Integrated Pumplight Homogenizer and Signal Injector for High-Power Laser System", U.S. Appl. No. 15/233,303, filed Aug. 10, 2016, 81 pgs.

(56) References Cited

OTHER PUBLICATIONS

Office Action dated Feb. 8, 2017 in connection with U.S. Appl. No. 15/233,238, 16 pages.
Invitation to Pay Additional Fees and Communication Relating to the Results of the Partial International Search dated Aug. 1, 2017 in connection with International Patent Application No. PCT/US2016/065988; 14 pages.
International Search Report and the Written Opinion of the International Searching Authority dated Dec. 15, 2016 in connection with International Application No. PCT/US2016/049149, 12 pages.
International Search Report and the Written Opinion of the International Searching Authority dated Dec. 15, 2016 in connection with International Application No. PCT/US2016/049152, 15 pages.
International Search Report and the Written Opinion of the International Searching Authority dated Dec. 15, 2016 in connection with International Application No. PCT/US2016/049151, 12 pages.
International Search Report and the Written Opinion of the International Searching Authority dated Dec. 15, 2016 in connection with International Application No. PCT/US2016/049146, 15 pages.
David Filgas, et al., "Recent Results for the Raytheon Reli Program", Laser Technology for Defense and Security VIII, SPIE, vol. 8381, No. 1, Bellingham, Washington, May 11, 2012, 8 pages.
Preliminary Amendment from U.S. Appl. No. 15/825,653, filed Nov. 29, 2017; 8 pages.
Preliminary Amendment from U.S. Appl. No. 15/825,677, filed Nov. 29, 2017; 8 pages.
Office Action dated Aug. 6, 2019 in connection with Japanese Patent Application No. 2018-559668, 8 pages.
Office Action dated Dec. 2, 2019 in connection with U.S. Appl. No. 15/825,677, 9 pages.

* cited by examiner

PLANAR WAVEGUIDES WITH ENHANCED SUPPORT AND/OR COOLING FEATURES FOR HIGH-POWER LASER SYSTEMS

CROSS-REFERENCE TO RELATED APPLICATION AND CLAIM OF PRIORITY

This application is a divisional of U.S. patent application Ser. No. 15/041,909 filed on Feb. 11, 2016, which is hereby incorporated by reference in its entirety.

TECHNICAL FIELD

This disclosure is generally directed to high-power laser systems. More specifically, this disclosure is directed to planar waveguides with enhanced support and/or cooling features for high-power laser systems.

BACKGROUND

High-power laser systems are being developed for a number of military and commercial applications. However, at high average output powers, problems associated with a lasing medium in a laser system are exacerbated. These problems include stress in the mounting of the lasing medium, inefficient and non-uniform cooling of the lasing medium, inefficient coupling of pumplight into the lasing medium, and inefficient coupling of laser beams into and out of the lasing medium.

Low-efficiency cooling may cause an unacceptable rise in the average temperature of the lasing medium relative to an inlet temperature of a coolant. Mounting stress and non-uniform heating can create phase distortions in an amplified output beam and can lead to damage or even fracturing of the lasing medium, which can also damage nearby elements of the laser system. Inefficient coupling of pumplight into the lasing medium can lead to overall laser inefficiencies, and stray pumplight can cause damage to the lasing medium or other elements of the laser system. Stray input or output laser beams can damage elements of the laser system, and the loss of power detracts from a total output power and an overall laser efficiency of the laser system.

SUMMARY

This disclosure provides planar waveguides with enhanced support and/or cooling features for high-power laser systems.

In a first embodiment, an apparatus includes a planar waveguide configured to receive and amplify optical signals. The planar waveguide includes a core region, first and second coating or cladding layers disposed on opposite sides of the core region, and one or more endcaps disposed between the first and second coating or cladding layers at one or more ends of the core region. The core region includes at least one material and is doped with at least one active ion species, and each endcap includes the at least one material and is not doped with any active ion species that creates substantial absorption at pump and signal wavelengths.

In a second embodiment, an apparatus includes a planar waveguide configured to receive and amplify optical signals. The planar waveguide includes a core region and at least one cladding layer disposed on the core region. The core region includes at least one crystal or crystalline material, and the at least one cladding layer includes at least one glass.

In a third embodiment, an apparatus includes a planar waveguide configured to receive and amplify optical signals. The planar waveguide includes a core region and first and second coating or cladding layers disposed on opposite sides of the core region. The apparatus also includes a first cooler disposed on or adjacent to the first coating or cladding layer and configured to cool the planar waveguide and a second cooler disposed on or adjacent to the second coating or cladding layer and configured to cool the planar waveguide. The first and second coolers are different types of coolers.

In a fourth embodiment, an apparatus includes a planar waveguide configured to receive and amplify optical signals. The planar waveguide includes a core region and at least one coating or cladding layer disposed on the core region. The apparatus also includes first and second side claddings disposed on opposite sides of the planar waveguide, where the opposite sides represent the longer sides of the planar waveguide.

In a fifth embodiment, an apparatus includes a planar waveguide configured to receive and amplify optical signals. The planar waveguide includes a core region and at least one coating or cladding layer disposed on the core region. The apparatus also includes first and second endcaps sealed to the planar waveguide and to a housing and one or more coolers sealed to the housing and configured to cool the planar waveguide. At least one of the one or more coolers is configured to receive a coolant and to direct the coolant through a passageway defined within an interior space of the housing, where the passageway includes a substantially linear passageway along a length of the planar waveguide.

In a sixth embodiment, an apparatus includes a planar waveguide configured to receive and amplify optical signals. The planar waveguide includes a core region and first and second coating or cladding layers disposed on opposite sides of the core region. The apparatus also includes a cooler disposed on or adjacent to the first coating or cladding layer and configured to cool the planar waveguide. The second coating or cladding layer is uncooled.

Other technical features may be readily apparent to one skilled in the art from the following figures, descriptions, and claims.

BRIEF DESCRIPTION OF THE DRAWINGS

For a more complete understanding of this disclosure, reference is made to the following description, taken in conjunction with the accompanying drawings, in which.

DETAILED DESCRIPTION

FIGS. 1 through 12, described below, and the various embodiments used to describe the principles of the present invention in this patent document are by way of illustration only and should not be construed in any way to limit the scope of the invention. Those skilled in the art will understand that the principles of the present invention may be implemented in any type of suitably arranged device or system.

Figure 1:
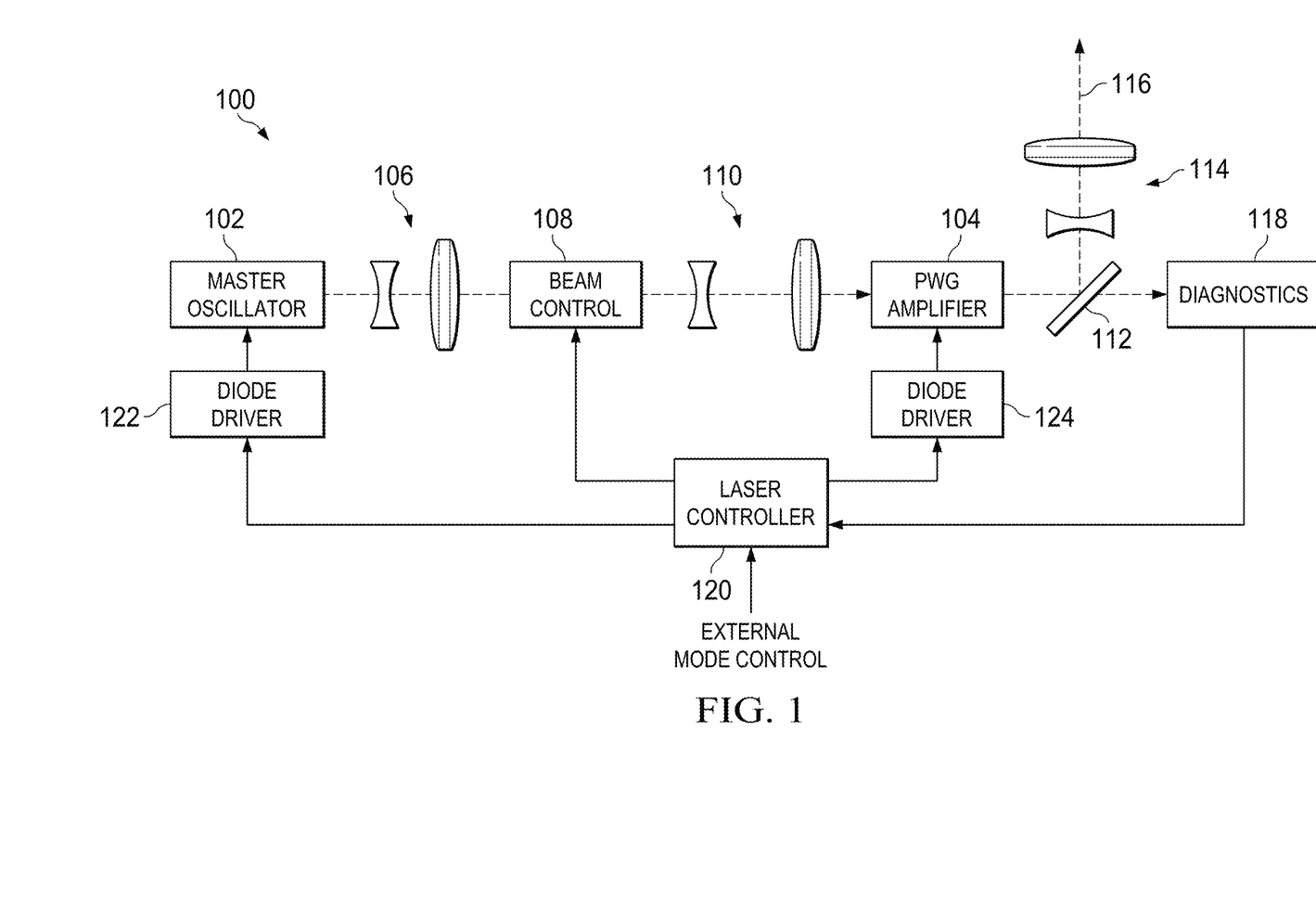
FIG. 1 illustrates an example high-power laser system according to this disclosure.

FIG. 1 illustrates an example high-power laser system 100 according to this disclosure. As shown in FIG. 1, the laser system 100 includes a master oscillator 102 and a planar waveguide (PWG) amplifier 104. The laser system 100 therefore has a master oscillator/power amplifier (MOPA) configuration.

The master oscillator 102 generally operates to generate low-power optical signals. The low-power optical signals could denote any suitable optical signals having relatively low power. For example, the low-power optical signals could include optical signals having a continuous wave (CW) output, a continuous pulse train (CPT), a pulse burst, or any of various other waveforms. The master oscillator 102 includes any suitable structure(s) for generating one or more low-power optical signals. In some embodiments, the master oscillator 102 includes a fiber laser.

The PWG amplifier 104 receives the low-power optical signals from the master oscillator 102 and pump power. The PWG amplifier 104 generally operates to amplify the low-power optical signals and generate high-power optical signals. For example, the PWG amplifier 104 could amplify a low-power CW or other optical signal into a high-power CW or other optical signal having ten kilowatts of power or more. The received pump power provides the necessary population inversion in the PWG amplifier's gain medium for this amplification.

The gain medium of the PWG amplifier 104 is formed using a planar waveguide. A planar waveguide generally denotes a structure that includes a core region and one or more coating or cladding layers. The core region is doped with an active ion species responsive to optical signals of at least one specific wavelength, and the one or more coating or cladding layers are optically transparent and contact the core region. The indexes of refraction and dielectric constants of the core region and the coating or cladding layer(s) differ and create boundaries that reflect the optical signals. The planar waveguide therefore operates to guide optical signals in its narrower dimension (referred to as the "fast axis" direction) but not in its broader dimension (referred to as the "slow axis" direction). The planar waveguide could be formed from any suitable materials and in any suitable manner.

Relay optics 106 direct the optical signals from the master oscillator 102 into a beam controller 108, and relay optics 110 direct the optical signals from the beam controller 108 into the PWG amplifier 104. The relay optics 106 and 110 can also alter the cross-sectional dimensions of the optical signals as needed for injection into the beam controller 108 and the PWG amplifier 104, respectively. Each of the relay optics 106 and 110 includes any suitable optical device(s) for directing or formatting optical signals.

The beam controller 108 generally operates to modify the optical signals from the master oscillator 102 before the optical signals reach the PWG amplifier 104. For example, the beam controller 108 could pre-distort the optical signals from the master oscillator 102 in order to substantially or completely compensate for distortions created within the PWG amplifier 104. The beam controller 108 includes any suitable structure(s) for pre-distorting or otherwise modifying optical signals in a controllable manner.

The high-power output beam generated by the PWG amplifier 104 is directed towards a beam splitter 112. The beam splitter 112 provides a substantial portion of the high-power output beam to relay optics 114, which provide that portion of the high-power output beam out of the laser system 100 as a high-power output beam 116. The beam splitter 112 also provides a small amount of the high-power output beam as samples to a feedback loop. The feedback loop is used to control and modify operation of the master oscillator 102, the PWG amplifier 104, and the beam controller 108. The beam splitter 112 includes any suitable structure(s) for splitting optical signals. The relay optics 114 include any suitable optical device(s) for directing or formatting optical signals.

The feedback loop here includes a diagnostics unit 118, a laser controller 120, and diode drivers 122-124. The diagnostics unit 118 generally operates to analyze the samples of the high-power output beam from the PWG amplifier 104 and provide diagnostic data to the laser controller 120. The diagnostics unit 118 includes any suitable structure for identifying one or more characteristics of at least one sample of a high-power output beam. In some embodiments, diagnostic data from the diagnostics unit 118 could be output by the laser controller 120, such as to one or more external destinations. This could allow the external destinations to monitor the health, status, or safety of the laser system 100.

The laser controller 120 generally operates to control the operation of the beam controller 108 and the diode drivers 122-124. The laser controller 120 includes any suitable structure for controlling operation of a laser system. For example, the laser controller 120 could include one or more processing devices, such as one or more microprocessors, microcontrollers, digital signal processors, field programmable gate arrays, application specific integrated circuits, or discrete logic devices. The laser controller 120 could also include one or more memories configured to store instructions or data used, generated, or collected by the processing device(s). The laser controller 120 could further include one or more interfaces configured to facilitate communications with other components or systems.

The diode driver 122 generates electrical drive signals that cause one or more laser diodes (or other light sources) of the master oscillator 102 to generate optical pump power for the master oscillator 102, which causes the master oscillator 102 to generate desired low-power optical signals. The diode driver 124 generates electrical drive signals that cause laser diodes (or other light sources) of the PWG amplifier 104 to generate optical pump power for the PWG amplifier 104, which uses the pump power to provide optical amplification. The diode driver 124 could be capable of operation across a range of input voltages and load conditions while protecting expensive laser diode strings from electrical shorts and transients. Each diode driver 122-124 includes any suitable structure(s) for driving any suitable arrangement of laser diodes or other light sources.

The laser system 100 can incorporate a number of novel features, which are described below. These novel features can be used individually or in any suitable combination. Various other features can also be incorporated into the laser system 100. For example, the laser system 100 could use the techniques disclosed in U.S. patent application Ser. No. 14/661,828 and U.S. Patent Publication No. 2014/0268309 (which are hereby incorporated by reference) to cool various components of the laser system 100, including the use of a thermal-optic interface (TOI) material. The laser system 100 could use the techniques disclosed in U.S. Patent Publication No. 2014/0268309 to suppress amplified spontaneous emission (ASE) within a PWG device, including the use of beveled edges on the PWG device. The laser system 100 could use the techniques disclosed in U.S. patent application Ser. No. 14/682,539 (which is hereby incorporated by reference), including the use of symmetric and asymmetric core regions in PWG devices. The laser system 100 could use the techniques disclosed in U.S. patent application Ser. No. 14/749,398 (which is hereby incorporated by reference), including the use of asymmetric two-layer PWG devices. The PWG amplifier 104 of the laser system 100 could be formed using the techniques disclosed in U.S. patent application Ser. No. 14/845,916 (which is hereby incorporated by reference), including the use of radio frequency (RF) magnetron sputtering and other techniques to form PWG-based laser devices.

Overall, the laser system 100 combines the benefits of fiber lasers (such as high gain with good beam quality) and bulk solid-state lasers (such as scalability) in an overall laser architecture that supports the generation of high-power laser outputs. The PWG amplifier 104 functions as a lasing element that facilitates high gain over a long amplifier path while simultaneously maintaining near diffraction-limited beam quality in one dimension (the fast axis of the PWG amplifier 104). Substantially uniform pumping of the lasing medium and substantially uniform cooling of the core region combine to produce a reasonably high-quality beam in the transverse dimension (the slow axis of the PWG amplifier 104).

Although FIG. 1 illustrates one example of a high-power laser system 100, various changes may be made to FIG. 1. For example, any single feature or combination of features described above and/or below could be used in the laser system 100. Also, the functional divisions shown in FIG. 1 are for illustration only. Components could be combined, further subdivided, omitted, or rearranged or additional components could be added according to particular needs.

Figure 2:
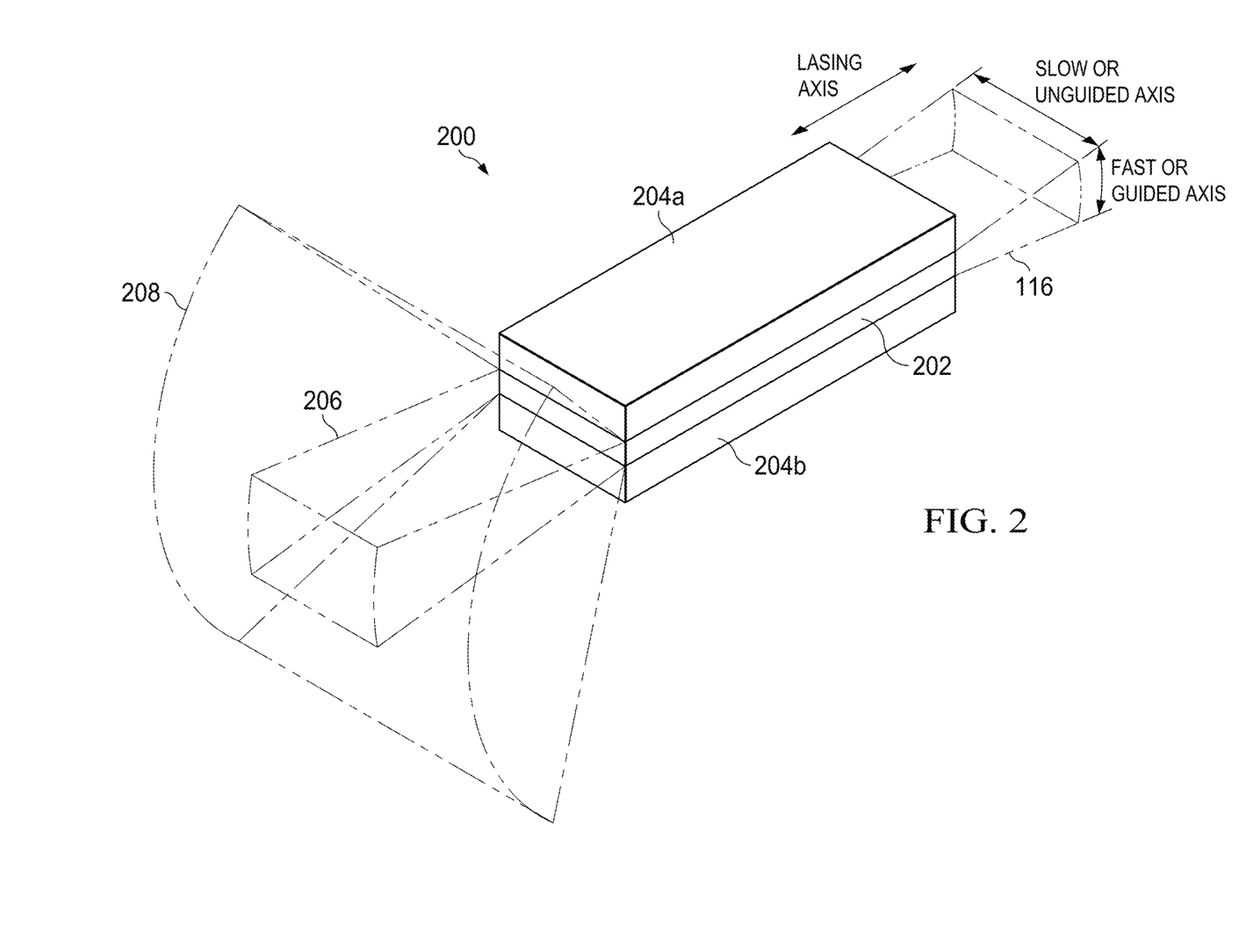
FIG. 2 illustrates an example planar waveguide (PWG) for use in a high-power laser system according to this disclosure.

FIG. 2 illustrates an example planar waveguide 200 for use in a high-power laser system according to this disclosure. The planar waveguide 200 could, for example, be used in the PWG amplifier 104 of the high-power laser system 100.

As shown in FIG. 2, the planar waveguide 200 includes a core region 202 and one or more coating or cladding layers 204a-204b. The core region 202 is doped with an active ion species responsive to optical signals of at least one specific wavelength, and the one or more coating or cladding layers 204a-204b are optically transparent and contact the core region 202. The core region 202 could be formed from any suitable material(s), such as doped yttrium aluminum garnet (YAG). Each cladding layer 204a-204b could also be formed from any suitable material(s), such as glass or YAG. A number of additional features, such as an anti-reflective coating on input or output face(s) of the coating or cladding layers 204a-204b, could be used.

A signal beam 206 from the master oscillator 102 is coupled into the core region 202 of the planar waveguide 200, and pumplight 208 is coupled into one or more of the coating or cladding layers 204a-204b to provide pump power for optical amplification. The indexes of refraction and dielectric constants of the core region 202 and the coating or cladding layer(s) 204a-204b differ and create boundaries that reflect the optical signals of the signal beam 206. The planar waveguide 200 therefore operates to guide the optical signals of the signal beam 208 in the "fast axis" or "guided axis" direction but not in the "slow axis" or "unguided axis" direction. Amplification is provided along the longer axis of the planar waveguide 200 (referred to as the "lasing axis").

The signal beam 206 is confined within the very thin guiding core region 202 that is doped with a lasing species, and the signal beam 206 is amplified via stimulated emission. The pumplight 208 is injected into the coating or cladding layer(s) 204a-204b on one or both sides of the core region 202, and the pumplight 208 is confined and efficiently coupled into the core region 202 along the entire length of the planar waveguide 200. The thickness of the core region 202 and the refractive index difference between the core region 202 and the coating or cladding layer(s) 204a-204b define a numerical aperture that supports only the lowest-order propagating mode. This helps to ensure high beam quality in the thin dimension (fast axis) of the planar waveguide 200.

In a MOPA configuration, the signal beam 206 from the master oscillator 102 is injected into one end of the active core region 202, where it is amplified in one or multiple passes through the planar waveguide 200. Since the signal beam 206 is unguided in the wide dimension (slow axis), the signal beam 206 is susceptible to thermal lensing effects due to non-uniform temperature distributions across the planar waveguide 200. It is also susceptible to depolarization due to thermally-induced stress birefringence. Stress may further produce wavefront distortions in the signal beam 206, depending on the strength of the stress-optic tensor in the lasing medium that additionally distorts the signal beam 206.

This disclosure provides various embodiments of planar waveguides that may improve the performance, reliability, and/or cost of a PWG laser. This can be accomplished by providing improved mechanisms for supporting and/or cooling a planar waveguide. Example embodiments providing these supporting and/or cooling mechanisms are described below.

Although FIG. 2 illustrates one example of a planar waveguide 200 for use in a high-power laser system, various changes may be made to FIG. 2. For instance, the size, shape, and dimensions of the various elements shown in FIG. 2 are for illustration only and can vary as needed or desired. As a particular example, the coating or cladding layers 204a-204b could have substantially different thicknesses, creating an asymmetric planar waveguide. As another particular example, the core region 202 could have a non-uniform thickness along the lasing axis.

Figure 3:
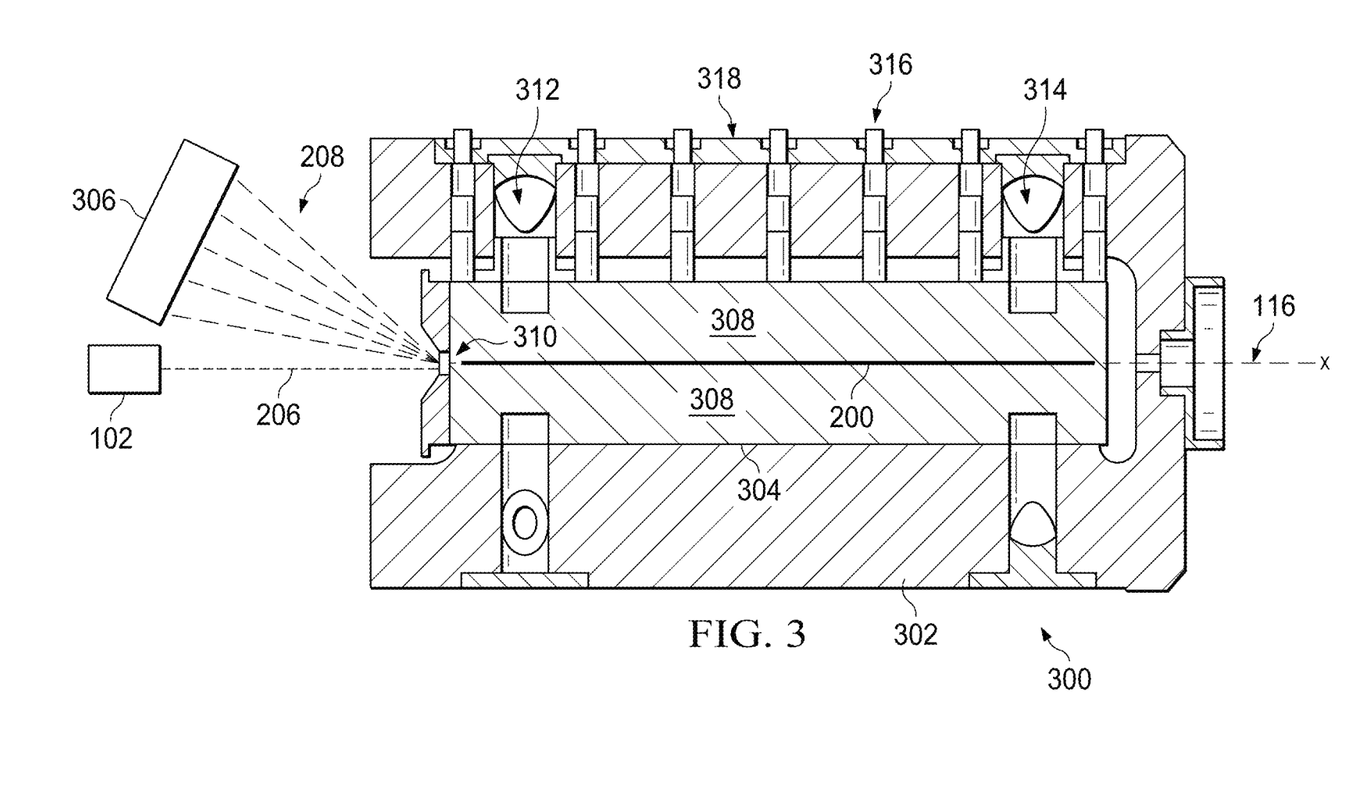
FIG. 3 illustrates an example PWG pumphead assembly of a high-power laser system according to this disclosure.

FIG. 3 illustrates an example PWG pumphead assembly 300 of a high-power laser system according to this disclosure. The pumphead assembly 300 could, for example, include the planar waveguide 200 of FIG. 2 and be used in the PWG amplifier 104 of FIG. 1.

As shown in FIG. 3, the PWG pumphead assembly 300 includes a PWG pumphead housing 302 and a PWG cartridge 304. The PWG cartridge 304 includes the planar waveguide 200, which receives the signal beam 206 from the master oscillator 102 and the pumplight 208. The pumplight 208 can be provided by any suitable source(s) 306, such as one or more arrays of laser pump diodes.

The PWG cartridge 304 includes two support blocks 308, and the planar waveguide 200 is located between the blocks 308. The blocks 308 could denote coolers or other structures used to hold or encase the planar waveguide 200. The blocks 308 could be formed from any suitable material(s) and in any suitable manner. In particular embodiments, each block 308 could denote a microchannel cooler, multi-jet liquid impingement cooler, cooling plate, ultra-thin liquid thermal-optical interface cooler (such as in U.S. patent application Ser No. 14/661,828), or other structure for cooling the planar waveguide 200.

A scraper mirror 310 reflects light that is not coupled into the planar waveguide 200. The scraper mirror 310 could form a part of or be connected to a light pipe, which can be used to couple the pumplight 208 into the cladding layer(s) of the planar waveguide 200. The light pipe or an endcap of the planar waveguide 200 can also help to homogenize the pumplight 208 prior to injection into the cladding layer(s) of the planar waveguide 200. The scraper mirror 310 includes any suitable structure for reflecting light. The light pipe includes any suitable optical device for confining, homogenizing, and/or transporting optical signals.

In some embodiments, at least the PWG cartridge 304 and optionally other components (such as the pumplight source or sources 306) are implemented as one or more replaceable cartridges for the laser system. Among other things, this cartridge-based approach allows different cartridge designs to be installed with common (possibly standardized) mechanical, thermal, electrical, and optical interfaces without making any changes to the pumphead and optical bench. As a particular example, different PWG cartridges 304 could include different planar waveguides and/or cooling mechanisms for the planar waveguides. Also, different design teams can create and test different designs for the various components of the laser system 100. There may be little or no need for one design team to wait for the development of one component of the laser system 100 to be completed before designing and testing another component of the laser system 100.

In some embodiments, the PWG cartridge 304 receives a cooling fluid through one or more channels, such as channels 312-314. For example, each block 308 could represent a cooler, and one or more of these coolers could operate using a flow of cooling fluid. The cooling fluid could be received through one or more of the cooling channels 312-314 and returned through one or more others of the cooling channels 312-314. In this example, the cooling channels 312-314 on opposite sides of the planar waveguide 200 are identical, although different arrangements of cooling channels could be used, or cooling channels could be omitted on one or both sides of the planar waveguide 200.

The PWG cartridge 304 is held in place using one or more clamps 316. A main body of the housing 302 could be formed from an integral piece of material, and a cover 318 can provide access to the interior of the housing 302. The cover 318 allows a portion of each clamp 316 to extend out of the housing 302 so that the clamp 316 can be adjusted. The clamps 316 push inward (down in FIG. 3) in order to secure the PWG cartridge 304 in place. Each clamp 316 includes any suitable structure for applying force against a PWG cartridge. The cover 318 includes any suitable structure allowing passage of a portion of at least one pusher assembly.

Although FIG. 3 illustrates one example of a PWG pumphead assembly 300 of a high-power laser system, various changes may be made to FIG. 3. For instance, the size, shape, and dimensions of the various elements shown in FIG. 3 are for illustration only and can vary as needed or desired.

Figure 4A:
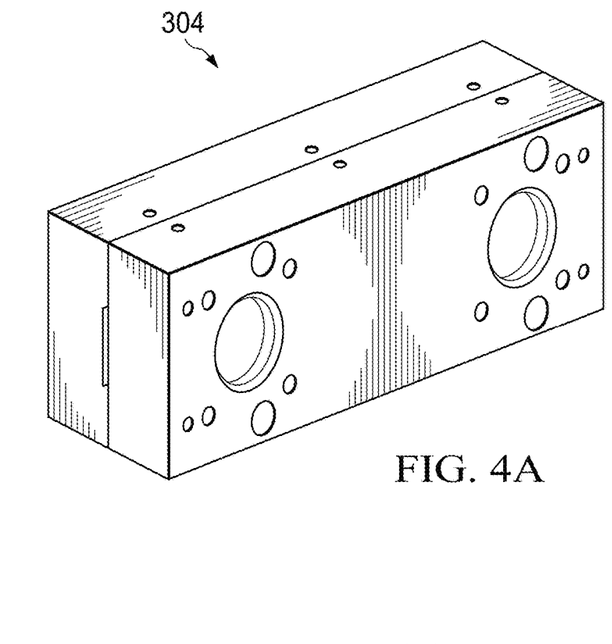
FIGS. 4A and 4B illustrate an example PWG cartridge for a PWG pumphead assembly of a high-power laser system according to this disclosure.
Figure 4B:
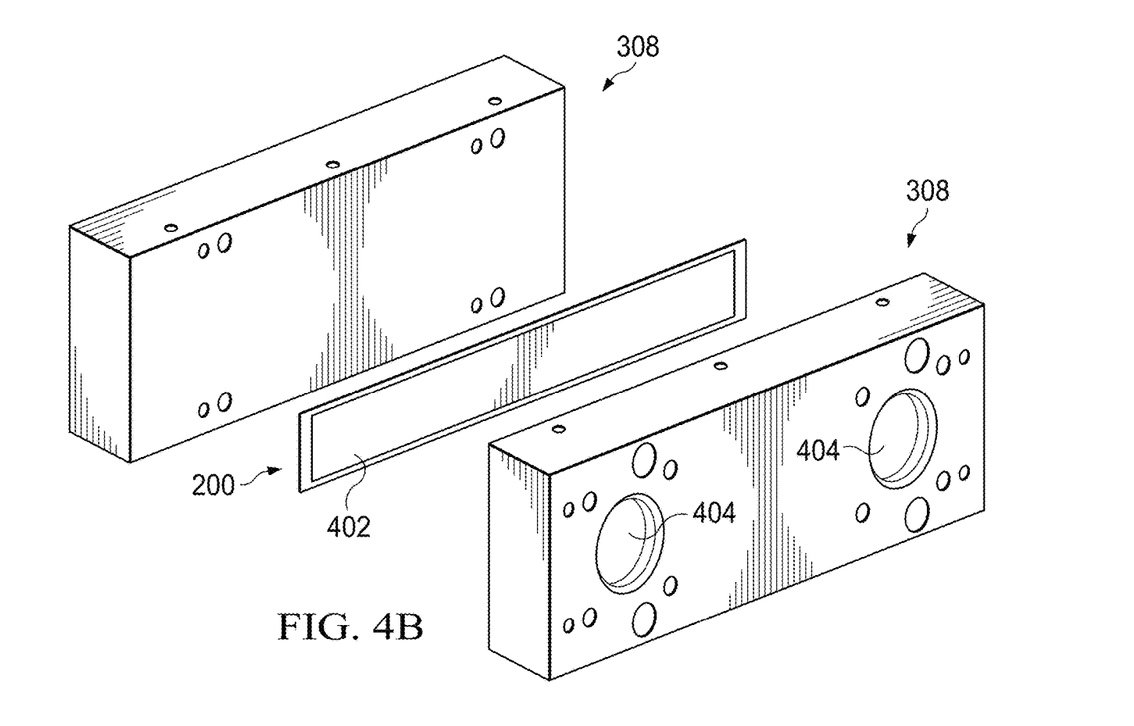

FIGS. 4A and 4B illustrate an example PWG cartridge 304 for a PWG pumphead assembly of a high-power laser system according to this disclosure. The PWG cartridge 304 could, for example, include the planar waveguide 200 of FIG. 2 and be used in the PWG pumphead assembly 300 of FIG. 3.

As shown in FIGS. 4A and 4B, the PWG cartridge 304 includes the planar waveguide 200. The planar waveguide 200 has at least one TOI material 402 placed in thermal contact with the broad clad faces of the planar waveguide 200. The exposed sides of the TOT material 402 can be bonded or otherwise attached to the blocks 308, which could represent one or more coolers. The attachment of the planar waveguide 200 to the blocks 308 could occur in any suitable manner, such as by using a thermally conducting epoxy. The blocks 308 include channels 404 that can be used to transport coolant to cool the PWG cartridge 304. For example, the channels 404 can align with the channels 312-314 of the housing 302.

The TOI material 402 includes any suitable material facilitating the transport of heat away from a planar waveguide. Each block 308 includes any suitable structure for removing heat from a planar waveguide. In some embodiments, for example, each block 308 could denote a copper microchannel heatsink module.

Although FIGS. 4A and 4B illustrate one example of a PWG cartridge 304 for a PWG pumphead assembly of a high-power laser system, various changes may be made to FIGS. 4A and 4B. For instance, the size, shape, and dimensions of the various elements shown in FIGS. 4A and 4B are for illustration only and can vary as needed or desired.

FIGS. 5 through 12 illustrate example arrangements for supporting and/or cooling a planar waveguide of a high-power laser system according to this disclosure. The embodiments of the planar waveguides shown in FIGS. 5 through 12 incorporate various features to reduce the mounting stresses on the planar waveguides and/or features to more uniformly cool the planar waveguides. Each of these implementations or other similar implementations could be used in the laser systems described above.

Figure 5:
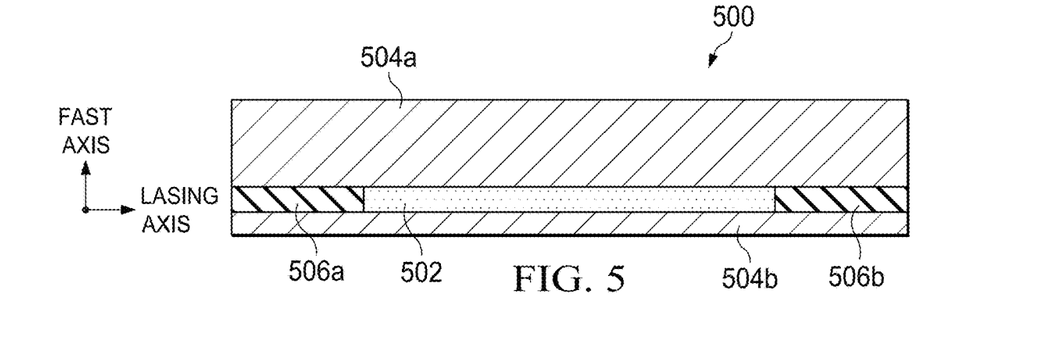
FIGS. 5 through 12 illustrate example arrangements for supporting and/or cooling a planar waveguide of a high-power laser system according to this disclosure.

As shown in FIG. 5, a planar waveguide 500 includes a core region 502 and one or more coating or cladding layers 504a-504b. As noted above, the core region 502 receives and amplifies a signal beam (such as the signal beam 206), and one or more of the coating or cladding layers 504a-504b receive pumplight (such as the pumplight 208). Note that in this example, the coating or cladding layers 504a-504b are asymmetric, which means the coating or cladding layers 504a-504b have substantially different thicknesses. In some embodiments, the thicker coating or cladding layer 504a may provide a stable structure for the core region 502 and can be substantially matched in its coefficient of thermal expansion to the core region 502 so that minimal stress is placed on the core region 502. However, the use of an asymmetric design is not required. In other embodiments, the coating or cladding layers 504a-504b have substantially the same thickness, leading to a symmetric configuration, which could allow the temperature profile and stress to be balanced between the layers 504a-504b.

Passive guiding endcaps 506a-506b are provided at the ends of the core region 502 in the planar waveguide 500. In some embodiments, the endcaps 506a-506b can be added to the core region 502 prior to formation or bonding of the coating or cladding layer(s) 504a-504b. The endcaps 506a-506b could be formed from any suitable material(s) and in any suitable manner. For example, in some embodiments, the endcaps 506a-506b could be formed from the same material(s) as the core region 502 (such as YAG), and the endcaps 506a-506b could be doped with at least one dopant to change their index of refraction. However, unlike the core region 502, any doping of the endcaps 506a-506b produces negligible absorption at the pump and signal wavelengths, so little or no lasing occurs within the endcaps 506a-506b. In FIG. 5, the endcaps 506a-506b are used at both ends of the planar waveguide 500 (namely an input end and an output end of the planar waveguide 500), although only one endcap 506a or 506b could be used at one end of the planar waveguide 500.

The one or more endcaps 506a-506b help to provide support for the planar waveguide 500 and reduce mounting stresses placed on the planar waveguide 500. For example, the endcaps 506a-506b do not provide lasing and are used for guiding optical signals, which means the endcaps 506a-506b are not heated as much as the core region 502. External support structures could therefore be placed in contact with the endcaps 506a-506b, such as to secure the planar waveguide 500 within a PWG cartridge 304. The reduced heating of the endcaps 506a-506b compared to the core region 502 can provide a more stable and less stressful mounting of the planar waveguide 500.

Figure 6:
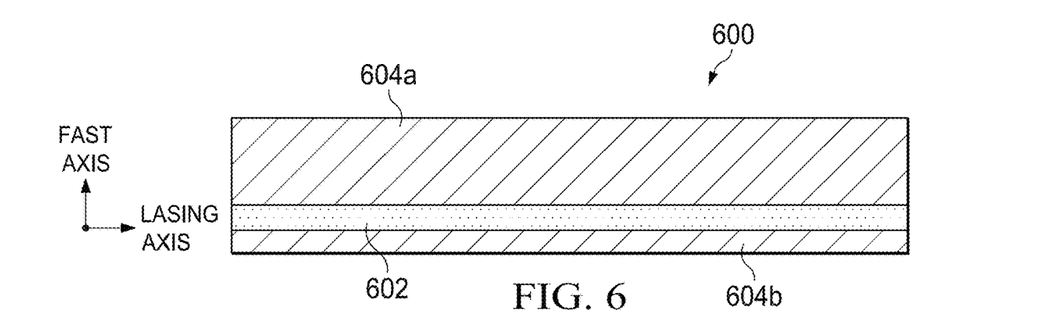

As shown in FIG. 6, a planar waveguide 600 includes a core region 602 and one or more cladding layers 604a-604b. As noted above, the core region 602 receives and amplifies a signal beam, and one or more of the cladding layers 604a-604b receive pumplight. Note that the cladding layers 604a-604b are asymmetric in this example, although a symmetric design could also be used.

The core region 602 in this example could be formed from a single crystal, a crystalline ceramic, or other crystalline material. Also, at least one of the cladding layers 604a-604b could be formed from a glass. The glass may be directly fused to the core region 602, such as by applying heat after the core and cladding surfaces are precisely contacted. Pressure may also be added during the fusing process to ensure a stable, robust bond. Various other approaches could be used to fuse glass and crystalline components together.

The coefficients of thermal expansion of the glass and crystalline components can be closely matched to reduce stresses on the planar waveguide 600 during operation. The index of refraction of the glass cladding layer(s) 604a-604b can be different from but close to the index of refraction of the core region 602, and the cladding layer(s) 604a-604b can have low absorption at the wavelengths of interest.

Figure 7:
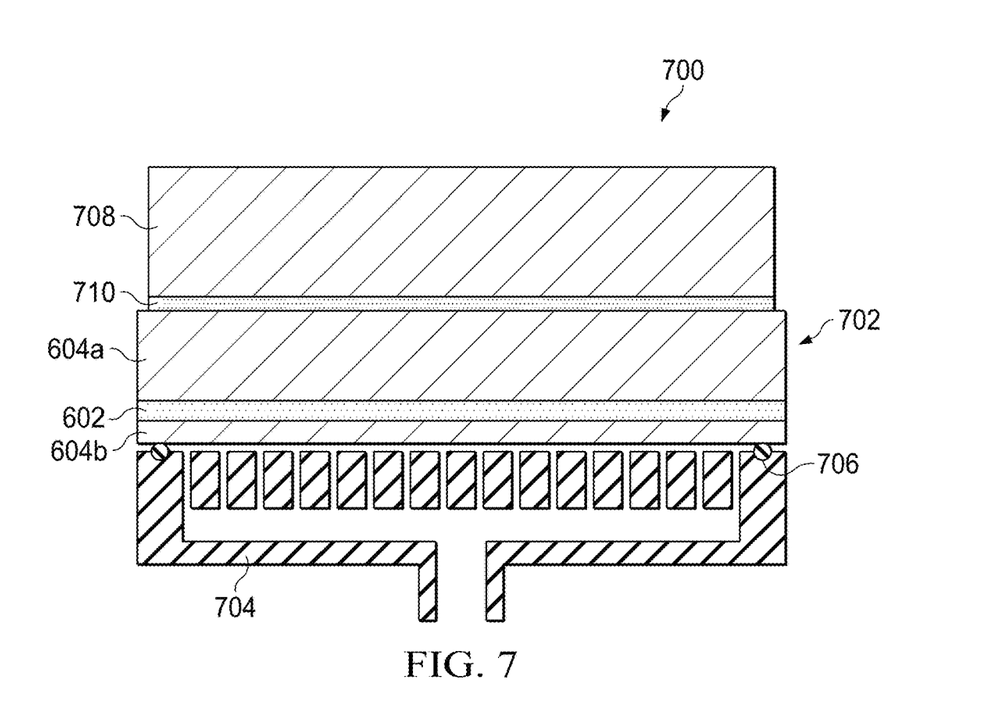

As shown in FIG. 7, a PWG assembly 700 includes a planar waveguide 702, which in this example is implemented using the core region 602 and the cladding layers 604a-604b of FIG. 6 (although other planar waveguides could be used). The planar waveguide 702 here is asymmetric, and as a result the thinner cladding layer 604b may increase in temperature less than the thicker cladding layer 604a during operation of the planar waveguide 702.

The PWG assembly 700 uses two different cooling interfaces for different sides of the planar waveguide 702. Each cooling interface could be optimized to perform desired functions or achieve specific goals, and those functions or goals need not be identical. For example, the cooling interface on one side of the planar waveguide 702 could be optimized for cooling, while the cooling interface on another side of the planar waveguide 702 could be optimized for minimizing Amplified Spontaneous Emission (ASE).

In this particular example, one cooling interface is implemented using a liquid cooling manifold 704. The liquid cooling manifold 704 could support any suitable direct liquid cooling technique. In this example, a multi jet liquid impingement cooler is used, although other approaches (such as ultra-thin liquid thermal-optical interface cooling or other approaches described above) may be used. A seal 706, such as an O-ring or other type of seal, helps to prevent leakage of the cooling liquid out of the liquid cooling manifold 704. Another cooling interface is implemented in FIG. 7 using a dry conductive cooler 708 that could be thermally coupled to the planar waveguide 702 using a thermal-optic interface (TOI) material 710. One example of this approach is described in U.S. Patent Publication No. 2014/0268309 (which was incorporated by reference earlier).

Note that in this example, the planar waveguide 702 could be replaced by another planar waveguide, such as the planar waveguide 500 of FIG. 5 or other asymmetrical or symmetrical waveguide. The ability to cool different sides of a planar waveguide, particularly different sides of an asymmetrical planar waveguide, using different cooling technologies helps to improve the overall cooling efficiency in a PWG assembly.

Figure 8:
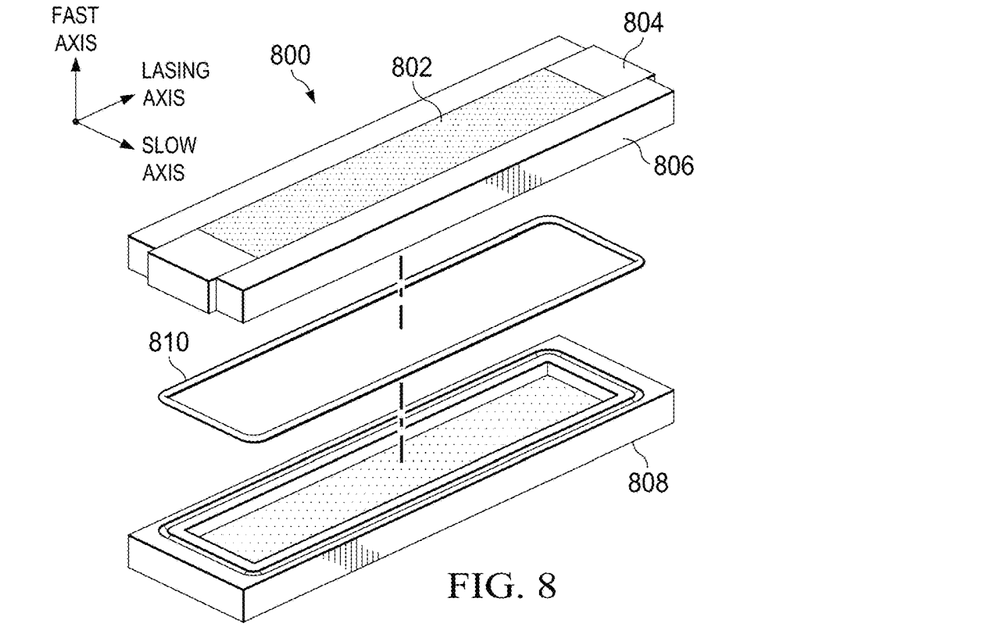

As shown in FIG. 8, a PWG assembly 800 includes a planar waveguide 802 and endcaps 804. The endcaps 804 could denote passive guiding endcaps or unguiding endcaps depending on the design on the planar waveguide 802. The endcaps 804 could be used at an input end and/or an output end of the planar waveguide 802. Also, side claddings 806 may be bonded or otherwise attached to the planar waveguide 802 along the longer sides of the planar waveguide 802, allowing the endcaps 804 to be used in conjunction with the side claddings 806 to provide a continuous mounting region. Any doping of the side claddings 806 produces negligible absorption at the pump and signal wavelengths, so little or no lasing occurs within the side claddings 806. The side claddings 806 could be formed from any suitable material(s) and in any suitable manner. For example, the side claddings 806 could be formed from the same material(s) as the cladding layer(s) of the planar waveguide 802. To avoid thermal stress under operation, the side claddings 806 may have a substantially similar coefficient of thermal expansion to elements of the planar waveguide 802, such as the thicker cladding layer of the planar waveguide 802.

A cooling manifold 808 is used here to cool the planar waveguide 802. The cooling manifold 808 represents any suitable structure for delivering cooling fluid to a planar waveguide, such as a multi jet liquid impingement cooler or other direct liquid cooler such as those described above. A seal 810 (such as an O-ring) is positioned between the PWG assembly 800 and the cooling manifold 808 to help prevent leakage of the cooling fluid. The endcaps 804 and the side claddings 806 can be used here to facilitate a more reliable seal for the cooling manifold 808. For example, planar waveguides tend to be more delicate structures, and reducing or eliminating contact between the planar waveguide 802 itself and the seal 810 can help to protect various structures in FIG. 8. Note, however, that the side claddings 806 could be used without the endcaps 804. Also note that while not shown, the same cooling interface or a different cooling interface could be used on the top side of the planar waveguide 802 in FIG. 8.

Figure 9:
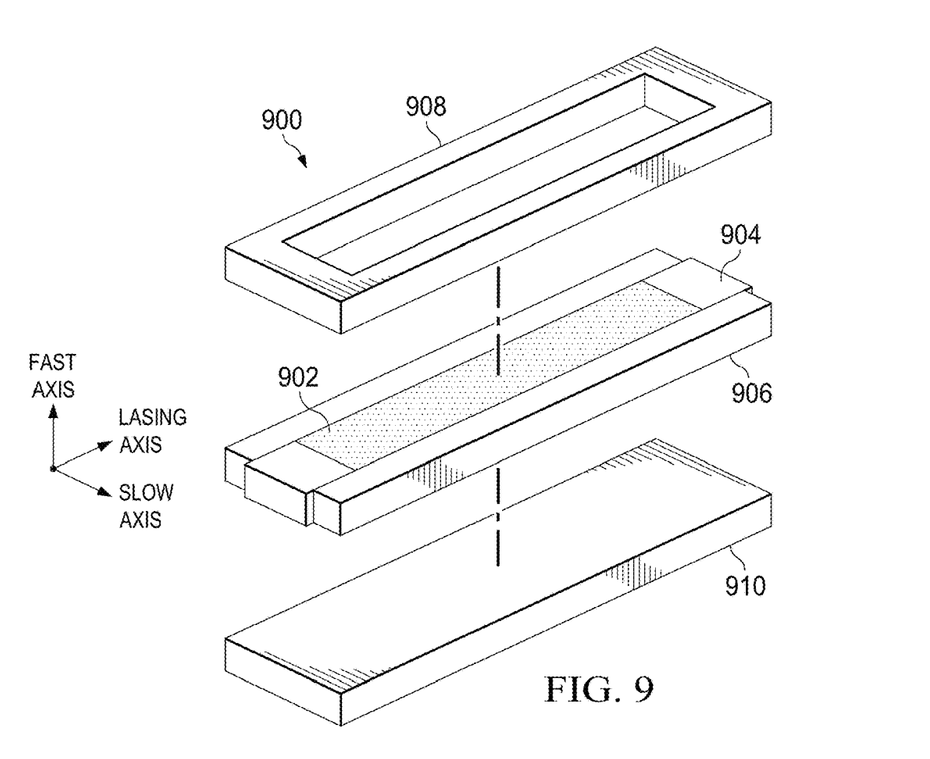

Other types of cooling interfaces could also be used with a planar waveguide having side claddings. For example, as shown in FIG. 9, a PWG assembly 900 includes a planar waveguide 902, endcaps 904, and side claddings 906. These components may be the same as or similar to corresponding components in FIG. 8. In FIG. 9, one cooling interface includes an aperture plate 908, which denotes a plate having an aperture (opening) in the central portion of the plate. The aperture plate 908 can be bonded to the side claddings 906 and to the endcaps 904 (if present). The aperture plate 908 provides a robust surface for an O-ring or other seal for a cooling manifold, placing the O-ring farther away from the input signal and high power output beam. The other cooling interface in FIG. 9 is formed using a solid plate 910, which could be bonded or otherwise attached to the planar waveguide 902 using the side claddings 906 and the endcaps 904 (if present). Any suitable bonding could be used here, such as an adhesive, epoxy, glass solder, metal solder, hydroxyl bond, or covalent bond. The use of a solid plate 910 can facilitate cooling and structural stiffness on the side opposite the liquid cooling manifold. Both the aperture plate 908 and the solid plate 910 could have a substantially similar coefficient of thermal expansion to element(s) of the planar waveguide 902.

Figure 10:
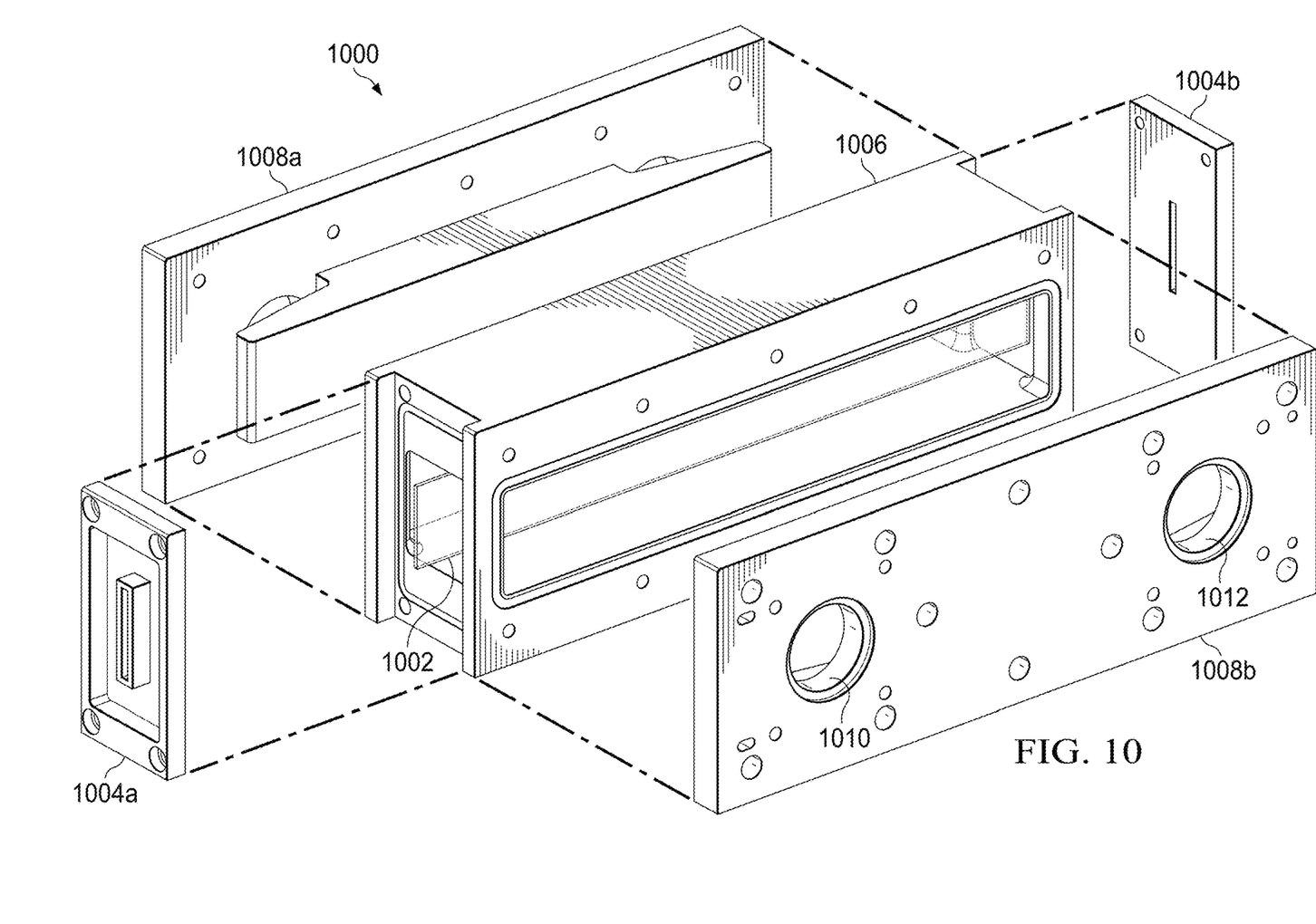
Figure 11:
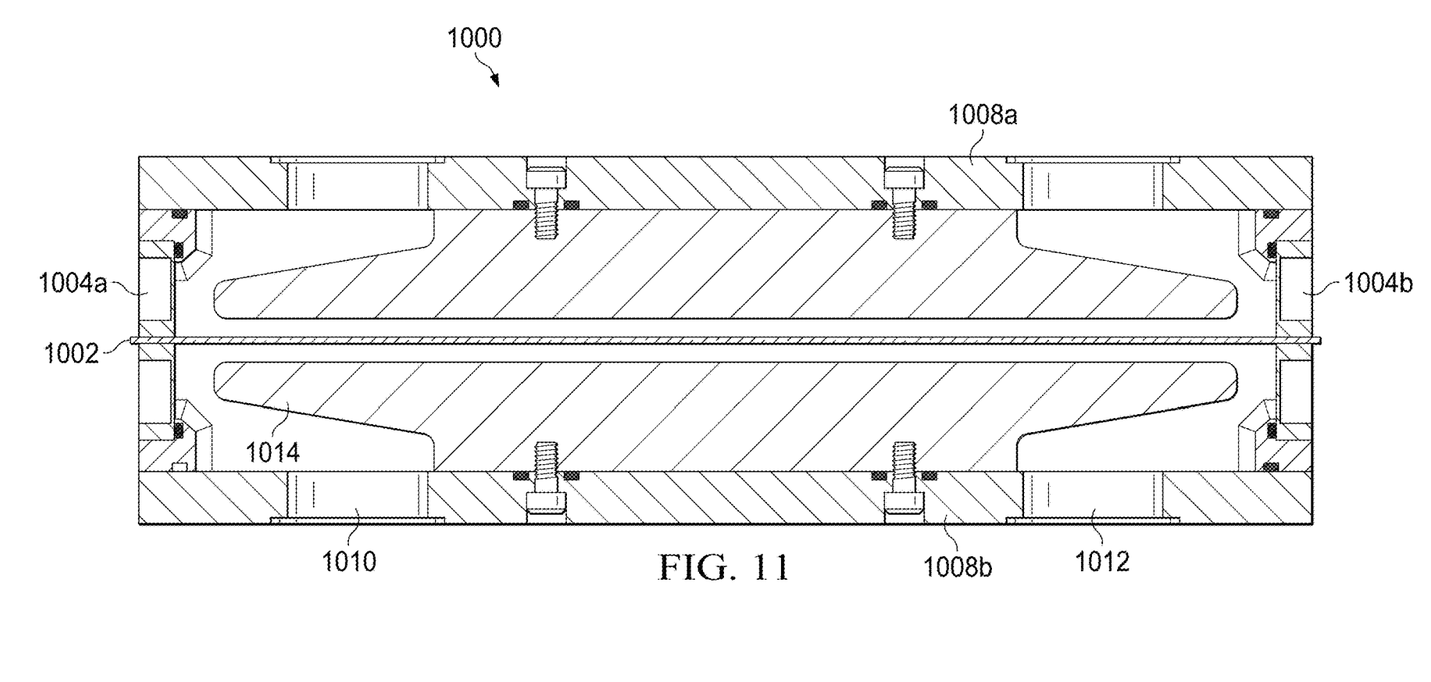

As shown in FIGS. 10 and 11, a PWG assembly 1000 includes a planar waveguide 1002 bonded or otherwise secured to two endcaps 1004a-1004b, which can be secured to a housing 1006. The endcaps 1004a-1004b include slots through which the planar waveguide 1002 can extend, allowing portions of the planar waveguide 1002 to remain partially exposed. Any suitable mechanism can be used to secure the planar waveguide 1002 to the endcaps 1004a-1004b, such as metal solder, glass solder, or ultraviolet (UV) curing adhesive. The endcaps 1004a-1004b create a seal around the ends of the planar waveguide 1002, but the endcaps 1004a-1004b can be somewhat compliant to allow for thermal expansion. Coolers 1008a-1008b are also bonded or otherwise secured to the housing 1006, and seals can be formed around the sides of the housing 1006. This creates a sealed internal cavity within which the planar waveguide 1002 is substantially located and through which cooling fluid can flow.

Each cooler 1008a-1008b here includes multiple channels 1010-1012 and a flow controller 1014. For each cooler 1008a-1008b, one of the channels 1010-1012 can allow passage of a cooling fluid into the interior of the housing 1006, and another of the channels 1010-1012 can allow exit of the cooling fluid from the interior of the housing 1006. The cooling fluid flows between the channels 1010-1012 within the interior of the housing 1006 through a passage defined by the flow controller 1014. The flow controller 1014 here creates a substantially linear passageway for the cooling fluid to flow past the planar waveguide 1002 along the length of the planar waveguide 1002. Note, however, that the flow controller 1014 could have any other suitable size and shape. The flow controller 1014 includes any suitable structure for defining a desired passageway for cooling fluid. In this example, the flow controller 1014 has a design in which the flow controller flares outward.

In the embodiment in FIGS. 10 and 11, the same cooling interface is used on both sides of the planar waveguide 1002. However, as with previous embodiments, different cooling interfaces could be used on different sides of the planar waveguide 1002. For example, the cooler 1008a could be used on one side of the planar waveguide 1002, and a slab cooler or other type of cooler could be used on the other side of the planar waveguide 1002. As with prior embodiments, the materials used in the cooling interfaces could have a substantially similar coefficient of thermal expansion to elements of the planar waveguide 1002.

Figure 12:
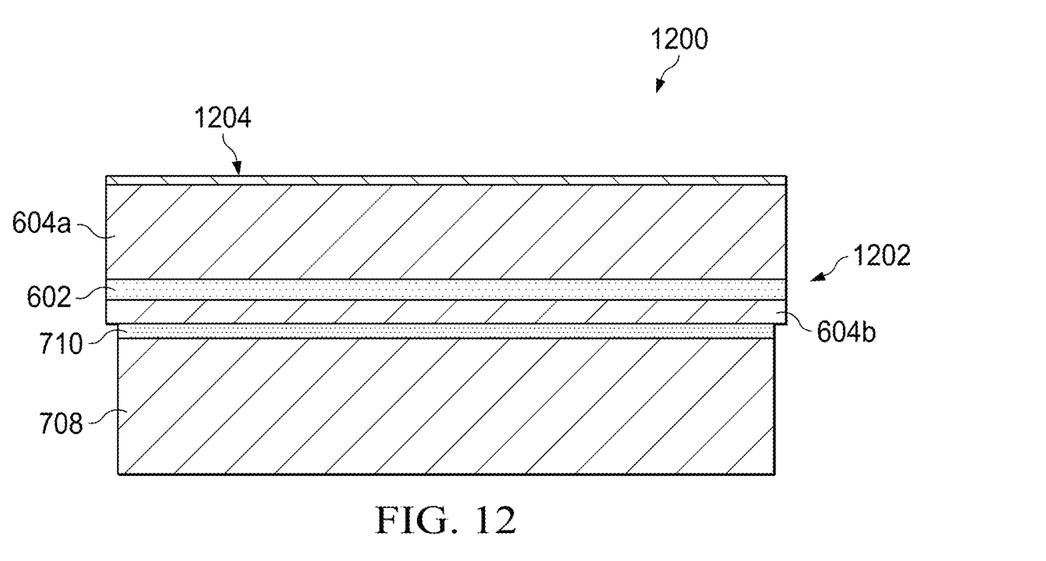

As shown in FIG. 12, a PWG assembly 1200 includes a planar waveguide 1202, which in this example is implemented using the core region 602 and the cladding layers 604a-604b of FIG. 6 (although other planar waveguides could be used). The planar waveguide 1202 here is asymmetric, and as a result the thinner cladding layer 604b may increase in temperature less than the thicker cladding layer 604a during operation of the planar waveguide 1202. The thinner cladding layer 604b is cooled using the dry conductive cooler 708 and the TOI material 710 of FIG. 7 (although other cooling techniques could be used with the thinner cladding layer 604b).

The thicker cladding layer 604a in this example is uncooled, meaning there is no active cooling used in conjunction with the thicker cladding layer 604a. However, due to the refractive index of air on the thicker cladding layer 604a, a large fluorescence heat load could be created on the cooler 708. Placing a transparent material 1204 with a proper index of refraction, such as sapphire or fused silica, on the thicker cladding layer 604a allows fluorescence to "leak out" of the PWG assembly 1200, thereby reducing heat loads on the cooler 708 and reducing temperature and stress in the PWG assembly 1200. Note that any suitable technique could be used to secure the transparent material 1204 to the thicker cladding layer 604a, such as clamping.

Because the cladding layer 604b is thinner than the cladding layer 604a, there will be less of a temperature rise through the thickness of the cladding layer 604b. Therefore, the surface of the cladding layer 604b can be cooled to help maintain the planar waveguide 1202 at a lower temperature than if the surface of the cladding layer 604a was cooled.

Although FIGS. 5 through 12 illustrate examples of arrangements for supporting and/or cooling a planar waveguide of a high-power laser system, various changes may be made to FIGS. 5 through 12. For example, each figure may include a symmetric or asymmetric planar waveguide of any suitable design. Also, a planar waveguide could include any single instance of the various cooling interfaces shown and described above or any other suitable cooling interface, or a planar waveguide could include multiple instances of one or more of the cooling interfaces shown and described above or any other suitable cooling interfaces. If multiple cooling interfaces are used, those cooling interfaces may or may not be identical.

High-power laser systems, such as the ones described above, could be used in a large number of military and commercial applications. The following discussion provides a description of various example commercial applications. However, the following discussion does not limit this disclosure to any particular applications.

High-power laser systems could find use in commercial mining applications, such as in drilling, mining, or coring operations. For instance, high-power laser systems could be used to soften or weaken an earth bed prior to drilling through the earth bed using drill bits. This could allow for fewer drill bit changes and extended lifetimes and reliabilities of the drill bits. Here, free-space propagation of a high-power laser beam from an output window of a laser system could be used, allowing deeper penetration at further distances compared to conventional fiber lasers.

High-power and high-beam quality laser systems could also find use in remote laser welding, cutting, drilling, or heat treating operations, such as in industrial or other automation settings. The use of a high-power and high-beam quality laser system allows the processing of thicker materials to occur at larger working distances from the laser system while minimizing the heat-affected zone and maintaining vertical or other cut lines. Among other things, this helps to support welding or cutting operations where proximity to the weld or cut site is difficult or hazardous. It also helps to protect the laser system and possibly any human operators from smoke, debris, or other harmful materials.

High-power laser systems could further find use in construction and demolition operations. Example operations could include metal resurfacing or deslagging, paint removal, and industrial demolition operations. High-power laser systems can be used to ablate material much faster and safer compared to conventional operations. As a particular example of this functionality, high-power laser systems could be used to support demolition of nuclear reactors or other hazardous structures. Here, the high-power laser systems could be used to cut through contaminated structures like contaminated concrete or nuclear containment vessels or reactors from long distances. This helps to avoid the use of water jet cutting or other techniques that create hazardous waste, such as contaminated water. It also provides improved safety since human operators can remain farther away from contaminated structures being demolished.

A number of additional applications are possible. For example, high-power laser systems could find use in power beaming applications, where high-power laser beams are targeted to photovoltaic (solar) cells of remote devices to be recharged. High-power laser systems could find use in hazardous material (HAZMAT) applications, where the laser systems are used to heat and decompose hazardous materials into less harmful or non-harmful materials.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
a planar waveguide configured to receive and amplify optical signals, the planar waveguide comprising a core region and at least one cladding layer disposed on the core region;
wherein the core region comprises at least one crystal or crystalline material; and
wherein the at least one cladding layer comprises at least one glass.

2. The apparatus of claim 1, where the at least one cladding layer comprises first and second cladding layers disposed on opposite sides of the core region, each cladding layer comprising the at least one glass.

3. The apparatus of claim 2, wherein the first and second cladding layers have substantially different thicknesses such that the planar waveguide is asymmetrical.

4. The apparatus of claim 3, further comprising:
a first cooler disposed on or adjacent to the first cladding layer and configured to cool the planar waveguide; and
a second cooler disposed on or adjacent to the second cladding layer and configured to cool the planar waveguide;
wherein the first and second coolers are different types of coolers.

5. The apparatus of claim 4, wherein:
the first cooler comprises a direct liquid cooler; and
the second cooler comprises a conductive cooler.

6. The apparatus of claim 1, wherein the at least one glass of the at least one cladding layer is directly fused to the at least one crystal or crystalline material of the core region.

7. The apparatus of claim 1, wherein the core region and the at least one cladding layer have closely-matched coefficients of thermal expansion.

8. A system comprising:
a master oscillator configured to generate optical signals;
a pump source configured to generate pumplight; and
a planar waveguide (PWG) amplifier configured to amplify the optical signals to generate amplified optical signals using the pumplight;
wherein the PWG amplifier comprises a planar waveguide configured to receive and amplify the optical signals, the planar waveguide comprising a core region and at least one cladding layer disposed on the core region;
wherein the core region comprises at least one crystal or crystalline material; and
wherein the at least one cladding layer comprises at least one glass.

9. The system of claim 8, where the at least one cladding layer comprises first and second cladding layers disposed on opposite sides of the core region, each cladding layer comprising the at least one glass.

10. The system of claim 9, wherein the first and second cladding layers have substantially different thicknesses such that the planar waveguide is asymmetrical.

11. The system of claim 10, wherein the PWG amplifier further comprises:
 a first cooler disposed on or adjacent to the first cladding layer and configured to cool the planar waveguide; and
 a second cooler disposed on or adjacent to the second cladding layer and configured to cool the planar waveguide; and
 wherein the first and second coolers are different types of coolers.

12. The system of claim 11, wherein:
 the first cooler comprises a direct liquid cooler; and
 the second cooler comprises a conductive cooler.

13. The system of claim 8, wherein the at least one glass of the at least one cladding layer is directly fused to the at least one crystal or crystalline material of the core region.

14. The system of claim 8, wherein the core region and the at least one cladding layer have closely-matched coefficients of thermal expansion.

15. The system of claim 8, further comprising:
 a feedback loop configured to control at least one of the master oscillator, the pump source, and the PWG amplifier based on samples of the amplified optical signals.

16. An apparatus comprising:
 a planar waveguide configured to receive and amplify optical signals, the planar waveguide comprising a core region and first and second cladding layers disposed on the core region;
 a first cooler disposed on or adjacent to the first cladding layer and configured to cool the planar waveguide; and
 a second cooler disposed on or adjacent to the second cladding layer and configured to cool the planar waveguide;
 wherein the core region comprises at least one crystal or crystalline material;
 wherein the first and second cladding layers comprise at least one glass; and
 wherein the at least one glass of the at least one cladding layer is directly fused to the at least one crystal or crystalline material of the core region.

17. The apparatus of claim 16, wherein the first and second cladding layers have substantially different thicknesses such that the planar waveguide is asymmetrical.

18. The apparatus of claim 17, wherein the first and second coolers are different types of coolers.

19. The apparatus of claim 18, wherein:
 the first cooler comprises a direct liquid cooler; and
 the second cooler comprises a conductive cooler.

20. The apparatus of claim 16, wherein different cooling interfaces are located on different sides of the planar waveguide, one of the cooling interfaces optimized for cooling the planar waveguide, another of the cooling interfaces optimized for minimizing amplified spontaneous emissions.

* * * * *